United States Patent
Knott et al.

(10) Patent No.: US 11,247,888 B2
(45) Date of Patent: Feb. 15, 2022

(54) METHOD FOR TIGHTNESS CONTROL OF A FILLING-SEALING UNIT FOR CONTAINERS, AND FILLING-SEALING MACHINE

(71) Applicant: KRONES AG, Neutraubling (DE)

(72) Inventors: Josef Knott, Neutraubling (DE); Florian Habersetzer, Neutraubling (DE)

(73) Assignee: KRONES AG, Neutraubling (DE)

( * ) Notice: Subject to any disclaimer, the term of this patent is extended or adjusted under 35 U.S.C. 154(b) by 115 days.

(21) Appl. No.: 16/627,179

(22) PCT Filed: Apr. 19, 2018

(86) PCT No.: PCT/EP2018/060013
§ 371 (c)(1),
(2) Date: Dec. 27, 2019

(87) PCT Pub. No.: WO2019/001794
PCT Pub. Date: Jan. 3, 2019

(65) Prior Publication Data
US 2020/0156916 A1      May 21, 2020

(30) Foreign Application Priority Data
Jun. 28, 2017   (DE) ..................... 10 2017 210 949.1

(51) Int. Cl.
*B67C 3/12*     (2006.01)
*B65B 31/06*    (2006.01)
(Continued)

(52) U.S. Cl.
CPC ............... *B67C 3/12* (2013.01); *B65B 31/06* (2013.01); *B67C 3/002* (2013.01); *B67C 3/007* (2013.01);
(Continued)

(58) Field of Classification Search
CPC .. B67C 3/12; B67C 3/06; B67C 3/002; B67C 3/007; B67C 3/26; B67C 2003/2697;
(Continued)

(56) References Cited

U.S. PATENT DOCUMENTS 3,751,973 A * 8/1973 Strauss ............... G01M 3/3236
73/45
3,785,195 A * 1/1974 Yasuhiro ................. G01N 3/12
73/37

(Continued)

FOREIGN PATENT DOCUMENTS

DE    102014104872 A1    10/2015
DE    102014104873 A1    10/2015
(Continued)

OTHER PUBLICATIONS

ISA European Patent Office, International Search Report Issued in Application No. PCT/EP2018/060013, dated Jul. 23, 2018, WIPO, 4 pages.

*Primary Examiner* — Nicolas A Arnett
(74) *Attorney, Agent, or Firm* — McCoy Russell LLP

(57) ABSTRACT

A method for tightness control of a filling-sealing unit (1) for containers (9) is described. According thereto, a pressure chamber formed at the filling-sealing unit is sealed by way of a first seal around a sealer that is movable therein and by way of a second seal around a pressure supply that is movable therein. According to the invention, a third seal formed for sealing the pressure chamber around a container neck finish is sealed from the outside with an attachment, a positive pressure and/or negative pressure is generated in the pressure chamber, the pressure line used for this purpose is closed, and then a pressure profile in the pressure chamber is measured. This allows a leakage to be selectively detected at the first and/or second seal and be distinguished from a leak at the third seal.

16 Claims, 4 Drawing Sheets

(51) Int. Cl.
 *B67C 3/00* (2006.01)
 *B67C 3/26* (2006.01)
 *G01M 3/32* (2006.01)
 *B67C 3/06* (2006.01)
 *B67C 7/00* (2006.01)

(52) U.S. Cl.
 CPC ............... *B67C 3/06* (2013.01); *B67C 3/26* (2013.01); *B67C 7/00* (2013.01); *G01M 3/3272* (2013.01); *B67C 2003/2697* (2013.01)

(58) Field of Classification Search
 CPC ........ B67C 7/00; B65B 31/06; G01M 3/3272; G01M 3/3209; G01M 3/02
 See application file for complete search history.

(56) References Cited

U.S. PATENT DOCUMENTS

| | | | | |
|---|---|---|---|---|
| 3,874,226 A * | 4/1975 | Weber | ................ | G01M 3/3209 |
| | | | | 73/45.2 |
| 3,894,424 A * | 7/1975 | Taylor | ................ | G01N 3/12 |
| | | | | 73/49.2 |
| 3,987,664 A * | 10/1976 | Hass | ................ | G01M 3/3281 |
| | | | | 73/49.2 |
| 4,144,742 A * | 3/1979 | Schmidt | ................ | G01N 3/12 |
| | | | | 141/105 |
| 4,291,573 A * | 9/1981 | Richter | ................ | G01M 3/3236 |
| | | | | 209/522 |
| 4,399,916 A * | 8/1983 | Richter | ................ | G01M 3/3236 |
| | | | | 209/523 |
| 4,530,202 A * | 7/1985 | Powell | ................ | B65B 31/06 |
| | | | | 141/57 |
| 6,230,472 B1 | 5/2001 | Stahlecker | | |
| 6,666,071 B1 * | 12/2003 | McCormick | ........ | G01M 3/3209 |
| | | | | 73/41 |
| 9,133,004 B2 * | 9/2015 | Clusserath | ................ | B67C 3/288 |
| 10,179,725 B2 * | 1/2019 | Clusserath | ................ | G01F 1/582 |
| 10,836,621 B2 * | 11/2020 | Meinzinger | ................ | B67C 3/10 |
| 2015/0284234 A1 * | 10/2015 | Meinzinger | ................ | B67C 3/225 |
| | | | | 141/7 |
| 2016/0257437 A1 * | 9/2016 | Sorbi | ................ | G01M 3/26 |

FOREIGN PATENT DOCUMENTS

| | | |
|---|---|---|
| EP | 3064468 A1 | 9/2016 |
| GB | 2112735 A | 7/1983 |

* cited by examiner

METHOD FOR TIGHTNESS CONTROL OF A FILLING-SEALING UNIT FOR CONTAINERS, AND FILLING-SEALING MACHINE

CROSS-REFERENCE TO RELATED APPLICATIONS

The present application is a U.S. National Phase of International Patent Application Serial No. PCT/EP2018/060013 entitled "METHOD FOR TIGHTNESS CONTROL OF A FILLING-SEALING UNIT FOR CONTAINERS, AND FILLING-SEALING MACHINE," filed on Apr. 19, 2018. International Patent Application Serial No. PCT/EP2018/060013 claims priority to German Patent Application No. 10 2017 210 949.1 filed on Jun. 28, 2017. The entire contents of each of the above-referenced applications are hereby incorporated by reference for all purposes.

TECHNICAL FIELD

The invention relates to a method for controlling the tightness of a filling-sealing unit according to the preamble of claim 1 as well as to a filling-sealing machine with a control unit configured to perform the method.

BACKGROUND AND SUMMARY

A method for filling containers is known from DE 10 2014 104 872 A1 and a method based on this for filling and sealing containers with a pressurized and, in particular, carbonated beverage is known from DE 10 2014 104 873 A1. The beverage is filled into an evacuated container and then closed under positive pressure. The neck finish portion of the containers is located in a pressure chamber when being filled and sealed, where a product feeder is first moved onto the neck finish portion in a sealing manner during the filling process and is moved away after the filling process. Thereafter, a sealer equipped with a closure is lowered onto the neck finish portion in the pressure chamber and the container is thus closed.

Between filling and sealing the containers, the pressure chamber is charged with $CO_2$, so that the same positive pressure substantially prevails in the pressure chamber as in the filled container. This avoids a drop in pressure when moving the product feeder away from the neck finish portion of the container. The sealer is lowered to the container in the chamber charged with $CO_2$, so that the filled product is subject to the $CO_2$ atmosphere after the container has been closed and the pressure chamber has been relieved.

The movable components in the pressure chamber, namely the product feeder and the sealer, are each sealed by way of seals against the pressure chamber in a gas-tight and liquid-tight manner in relation to the positive pressures and negative pressures required during filling. Furthermore, the neck finish portion of the containers is sealed by another seal in a gas-tight and liquid-tight manner against the wall of the pressure chamber. For this purpose, this seal can be formed to have multiple parts and, for example, wrap in a forcipate manner around the neck finish portion of the container inserted into the pressure chamber.

Charging the pressure chamber with $CO_2$ at a predetermined positive pressure is essential for correctly filling products containing $CO_2$ into the containers. This prevents the $CO_2$ partial pressure above the product from dropping below the respective saturation pressure and the product from foaming over.

This requires the above-mentioned seals to function properly. It is true that the pressure conditions in the pressure chamber can in principle be monitored by use of pressure sensors and charging $CO_2$ correctly can thus be overall determined.

The problem, however, is that, for example, in the event of a pressure drop in the pressure chamber, it has previously not been possible to readily determine which seal is responsible for this. The necessary inspection of all possible seals causes an undesirable amount of expenditure of time.

There is therefore a need for a simplified procedure for tightness control of such filling-sealing units and for filling-sealing machines that are controllable accordingly.

The object given is satisfied with a method according to claim 1. According thereto, it is used for tightness control of a filling-sealing unit for containers, where a pressure chamber formed at the filling-sealing unit is sealed by way of a first seal around a sealer that is movable therein and by way of a second seal around a product feeder movable therein. According to the invention, a third seal formed for sealing the pressure chamber around a neck finish portion, a neck portion, and/or shoulder portion of the container is temporarily sealed from the outside with an attachment. In addition, a positive pressure and/or negative pressure is generated in the pressure chamber, the pressure line used for this purpose is closed, and then a pressure profile in the pressure chamber is measured.

The sealing function of the third seal is meanwhile replaced by the sealing attachment, so that an inadmissible deviation of the pressure profile measured from a predetermined pressure profile indicates a defect on the first and/or second seal. The predetermined pressure profile is in particular a permissible pressure drop relative to a positive pressure generated in the pressure chamber and/or a permissible pressure increase relative to a negative pressure generated in the pressure chamber.

The pressure profile is preferably measured when having a positive pressure and/or a negative pressure while the sealer is moved from a resting position to a sealing position and/or in the opposite direction. This makes it more likely to provoke a loss of pressure at the first seal than with a sealer resting. Likewise, a detected leakage can then be better assigned to the first or second seal.

The pressure profile is preferably measured when having a positive pressure and/or a negative pressure while the product feeder is moved from a resting position to a filling position and/or in the opposite direction. This makes it more likely to provoke a loss of pressure at the second seal than with a product feeder resting. Likewise, a detected leakage can then be better assigned to the first or second seal.

The first seal can also be referred to as a sealer seal. The second seal can also be referred to as a product feeder seal. The third seal can also be referred to as a container seal.

The pressure profile in the pressure chamber is measured, for example, using a pressure sensor and recorded by a control unit of the filling-sealing unit or a similar computing unit.

The attachment is, for example, a CIP attachment which further seals the pressure chamber in a liquid-tight manner for so-called cleaning-in-place (CIP). The attachment is placed in a gas-tight manner from the outside onto a housing of the filling-sealing unit enclosing the pressure chamber such that the third seal is located within the attachment and therefore has no sealing function.

Furthermore, the attachment is preferably removed and a container is introduced with its neck finish portion, neck portion, and/or shoulder portion into the third seal. For this purpose, the third seal is preferably inflated with compressed air in its seal seat. Other pressure fluids are also conceivable, for example, a liquid. In addition, a positive pressure and/or negative pressure is generated in the pressure chamber, the pressure line used for this purpose is closed, and then a pressure profile in the pressure chamber is measured. Compared to a correct pressure profile with a sealing attachment, an inadmissible deviation of the pressure profile from a predetermined pressure profile with the container inserted indicates a malfunction of the third seal.

Alternatively or in addition, the attachment is preferably removed and a test member simulating the neck finish portion, the neck portion, and/or the shoulder portion of the container is introduced into the third seal. In addition, a positive pressure and/or negative pressure is generated in the pressure chamber, the pressure line used for this purpose is closed, and then a pressure profile in the pressure chamber is measured. This also makes it possible to detect a malfunction of the third seal in comparison to a correct pressure profile with a sealing attachment, in case the pressure profile measured with the test member inserted deviates impermissibly from a predetermined pressure profile. For this purpose, the test member seals the pressure chamber with a correctly functioning third seal towards the bottom in a gas-tight manner.

Test members can be used to simulate certain properties and/or dimensional/shape deviations of the containers in a selected manner, for example, a deviation from an ideally round cross-section that occurs in practice. It is also possible to estimate at which dimensional/shape deviations a correct function of the third seal is still given, for example, when it is new and/or after certain operating hours.

Preferably, a positive pressure of at least 1 bar is generated in the pressure chamber, in particular, of at least 3 bar. In this way, the pressure conditions required for correctly pressurizing the pressure chamber during filling and sealing can be simulated.

The positive pressure is preferably generated by introducing $CO_2$. $CO_2$ is suitable as pressure gas for filling and sealing the containers in particular to the extent that they are filled with products containing $CO_2$, especially beverages. The tightness control can therefore be performed under production conditions.

Preferably, a negative pressure of 0.3 bar or less is generated, in particular of a maximum of 0.1 bar. This allows the tightness of the seals to be verified at the negative pressures that re typical when evacuating the containers.

Tightness control is preferably performed with a higher positive pressure and/or lower negative pressure than the positive pressures/negative pressures used during normal operation, typically at least including the upper limits/lower limits of the respective pressure specifications for the production operation.

The pressure profile in the pressure chamber is preferably measured respectively over a period of at least 1 s, in particular at least 5 s. This makes it possible to make reliable statements about the tightness of the seals to be examined, possibly also to determine an imminent leak, for example, in the context of a trend analysis.

Tightness control is preferably performed at all filling-sealing units of a filling-sealing machine. The filling-sealing machine is preferably a rotary machine with a plurality of circumferential uniformly arranged filling-sealing units. This enables comprehensive operational control of the filling-sealing machine.

Tightness control for every filling-sealing unit is preferably performed at least twice consecutively with different containers. This means in particular that the filling-sealing machine performs at least two complete revolutions with container feed and tightness control for each filling-sealing unit. This increases the information content about the tightness control for individual filling-sealing units, especially taking into account the manufacturing tolerances at the neck finish portion and/or shoulder portion of the containers.

The filling-sealing units are preferably moved to a corrective maintenance point of the filling machine in case they fail the tightness control. The respective filling-sealing units can be repaired there by personnel one after the other.

Tightness control is preferably performed with the containers at a reduced rotational speed of the filling-sealing machine relative to normal production operation. As a result, the pressure profile can be monitored for a longer time than at the normal rotational speed. This increases the information content of the tightness control, especially in the case of small and/or slow deviations of the pressure profile, for example, to detect an imminent leak.

Tightness control is preferably performed with the containers at a rotational speed of the filling-sealing machine used for production operation. This enables a tightness control particularly in step with actual practice.

Alternatively or in addition, tightness control can be performed with the containers when the filling machine is at a standstill. The pressure profile in the pressure chamber can then be measured, for example, over a period of time independent of the rotational speed and/or under special test conditions, such as for verifying certain pressure specifications.

Tightness control is preferably performed several times during and/or between the ongoing production operation and at least one trend analysis based thereon is created for the filling-sealing units controlled for tightness. Also minor changes of the pressure profile in the pressure chamber for individual filling-sealing units can then provide information about an imminent malfunction of individual seals and the respective filling-sealing unit as a whole.

For a particularly meaningful evaluation of the pressure measurement, a preferably temporal profile of the positive pressure/negative pressure in the pressure chamber is monitored and evaluated, as opposed to a simple pressure comparison with a threshold value or the like.

Correct pressure profiles are preferably determined empirically. Based on this, warning thresholds and/or stop thresholds can be set, in particular maximum allowable negative pressure values and minimum allowable positive pressure values. Such thresholds could be, for example, 20% above or below the correct pressure profile. Visually speaking, a time corridor can be specified in this way, within which the pressure readings must be located.

The pressure readings are preferably stored for each filling-sealing unit in the sense of an individual inspection history. Pressure histories measured at certain time intervals, such as weekly or otherwise defined sequences, can then be compared. If, for example, an individual trend towards an increasing pressure loss/pressure increase in the pressure profile arises therefrom, then one can conclude from this creeping development of the seal failure. This can therefore be predicted in order to initiate appropriate corrective repair measures at the respective filling-sealing unit at an appropriate time.

Preferably, a CIP agent is passed prior to tightness control through the filling-sealing unit sealed with the attachment. The CIP agent allows the filling-sealing unit to be cleaned without it being dismantled and/or disassembled. In addition, the subsequent tightness control can exclude the possibility that an inadmissible pressure profile is caused by fouling.

The object given is also satisfied with a filling-sealing machine which comprises filling-sealing units revolving circumferentially at a carousel as well as a programmable control unit for performing test runs following the method according to at least one of the previously described embodiments.

The control unit is then preferably configured to control an associated positive pressure source and/or an associated negative pressure source as well as valves for opening and closing pressure lines and flushing lines in a temporally appropriate sequence. The control unit is then preferably configured to drive the filling-sealing machine at a suitable rotational speed and to position containers and/or suitable test members in the filling-sealing units. The control unit is then preferably configured to control the tightness control process with the sealing attachments and with a container or test member inserted for each of the filling-sealing units to be controlled.

BRIEF DESCRIPTION OF FIGURES

Preferred embodiments of the invention are illustrated in the drawings, where.

DETAILED DESCRIPTION

Figure 1:
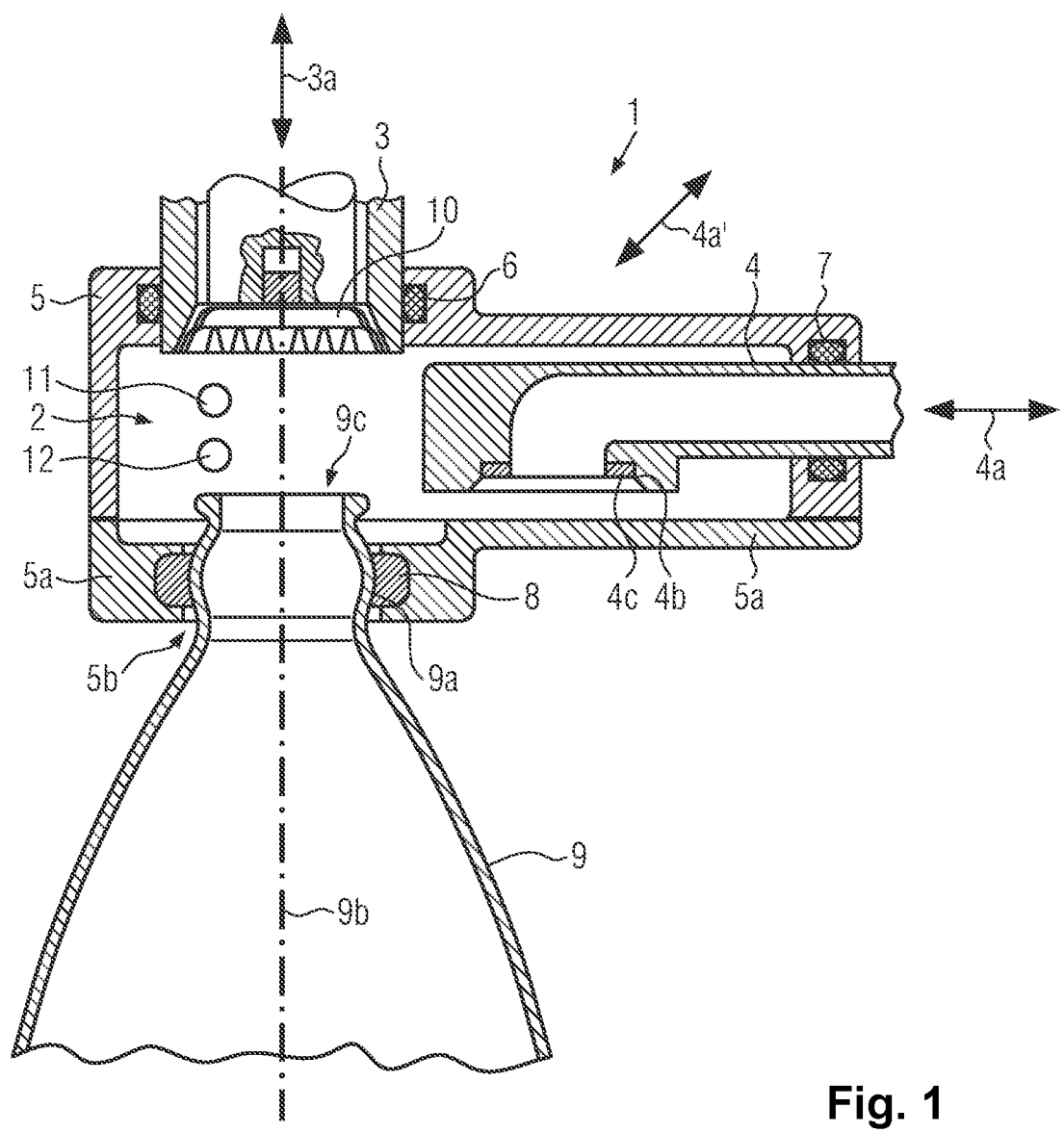
FIG. 1 shows a schematic longitudinal sectional view through a filling-sealing unit with a container.

As is evident from FIG. 1, the filling-sealing unit 1 according to a preferred embodiment comprises a pressure chamber 2, sealer 3 movable therein, and a product feeder 4 movable in pressure chamber 2. Product feeder 4 and sealer 3 are known to be formed for a successive actuation from their resting positions to a filling position or sealing position, respectively.

Sealer 3 is sealed by way of a first seal 6 against a housing of filling-sealing unit 1 surrounding pressure chamber 2. First seal 6 is, for example, a lip seal. Product feeder 4 is sealed against housing 5 by way of a second seal 7. Second seal 7 is, for example, a rubber-preloaded plastic seal.

Seated in a lower portion 5a of housing 5 is a third seal 8 which is configured to receive and seal a neck finish portion 9a and/or an adjoining neck portion and/or an adjoining shoulder portion of a container 9 to be filled with a liquid product and to be closed. Third seal 8 is preferably formed as an elastic torus and, for example, made of suitable plastic material. Third seal 8 can be acted upon with compressed air to seal neck finish portion 9a, the neck portion and/or the shoulder portion. Neck finish portion 9a, the neck portion and/or the shoulder portion of container 9 can be enclosed by third seal 8 in a liquid-tight and gas-tight manner in relation to the prevailing positive pressures and/or negative pressures.

Lower section 5a of housing 5 comprises a sealing seat 5b for third seal 8, where sealing seat 5b can shaped in a forcipate manner with a parting line which, for example, coincides with the drawing plane of FIG. 1. This allows lower section 5a of housing 5 to be opened along the parting line and to be closed again after container 9 has been positioned.

First seal 6 and second seal 7 seal pressure chamber 2 in the various operating positions of sealer 3 and product feeder 4 in a gas-tight and liquid-tight manner in relation to the positive pressures and/or negative pressures prevailing during the working operation of filling-sealing unit 1 in vacuum chamber 2.

First seal 6 there allows for a lifting motion 3a of sealer 3 substantially coaxial to center axis 9b of container 9 to a sealing position, in order to tightly seal neck finish 9c of container 9 with a closure 10, for example, a crown cap.

Furthermore, second seal 7 allows for a linear motion 4a of product feeder 4 to a filling position in order to place an outlet opening 4b of product feeder 4 onto neck finish portion 9a of container 9 preferably in a self-centering manner around neck finish 9c. For gas-tight and liquid-tight placement of outlet opening 4b, for example, a fourth seal 4c can be formed therearound.

It is only schematically indicated in FIG. 1 that product feeder 4 could also be placed onto neck finish portion 9a in an alternative linear motion 4a' inclined relative to the lifting direction 3a of sealer 3. In this case as well, outlet opening 4b would be to be aligned orthogonally to center axis 9b.

As a further alternative, a pivoting mechanism for product feeder 4 would also be conceivable to place the latter onto neck finish portion 9a, provided that a seal is given by way of second seal 7 against housing 5 and subsequent lowering of sealer 3 onto neck finish portion 9a.

Indicated schematically in FIG. 1 are furthermore a first pressure line 11 for introducing a pressurization gas, in particular $CO_2$, with a positive pressure into pressure chamber 2 and a second pressure line 12 for generating a negative pressure in pressure chamber 2. First pressure line 11 can also be referred to as a pressurization gas line, second pressure line 12 can also be referred to as a vacuum line.

A cleaning agent for cleaning filling-sealing unit 1 overall (CIP) can be introduced via different product, pressurization gas and/or vacuum lines in a known manner, i.e. without disassembling or dismantling filling-sealing unit 1.

The position of pressure lines 11, 12 in pressure chamber 2 is irrelevant, provided that the following described generation of positive pressure and/or negative pressure in pressure chamber 2 and/or the action of a cleaning agent are given. In principle, the positive pressure and/or negative pressure in pressure chamber 2 can also be generated by product feeder 4 and media lines connected thereto, see, for example, FIG. 2.

Figure 2:
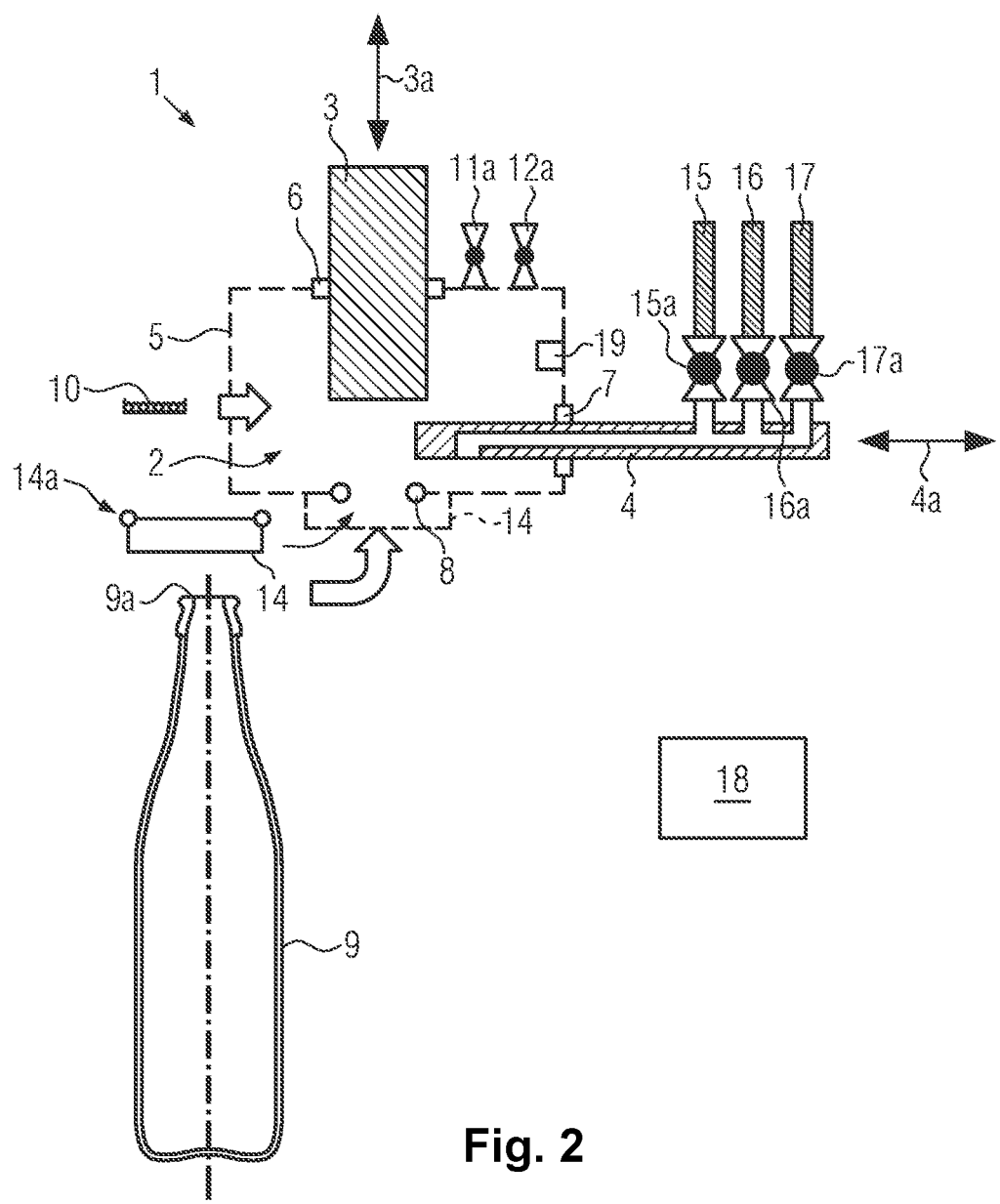
FIG. 2 shows a schematic representation of the filling-sealing unit with associated media lines.

FIG. 2 illustrates components of filling-sealing unit 1 in connection with a media lead known per se through product feeder 4 and in connection with an attachment 14 for covering third seal 8 against the exterior in a gas-tight manner.

Attachment 14 can be temporarily attached to lower partial section 5a of housing 5 around sealing seat 5b formed therein in a sealing manner.

For example, attachment 14 is a CIP cover for seal seat 5b and third seal 8. Attachment 14 can be attached in a gas-tight and liquid-tight manner, for example, for a CIP process, so that the region of sealing seat 5b is sealed independently of the function and structural integrity of third seal 8. For this purpose, for example, a fifth seal 14a is present at attachment 14.

Product feeder 4 can be selectively connected to a product line 15, to a pressurization gas line 16 and to a vacuum line 17 by way of separately controllable valves 15a, 16a, 17a.

Also schematically indicated are valves 11a, 12a for controlled and selective opening and closing of first and second pressure lines 11, 12.

For example, a control unit 18 is available for time-coordinated actuation of valves 11a, 12a and 15a to 17a and can also be used for recording readings from a schematically indicated pressure sensor 19 for monitoring pressure profiles DV (see FIG. 5) in pressure chamber 2.

First and second seals 6, 7 seal the regions of sealer 3 and the product feeder 4 independently of their positions in a liquid-tight and gas-tight manner at the pressures occurring during normal operation of filling-sealing unit 1. The same applies to third seal 8 with container 9 inserted.

Figure 5:
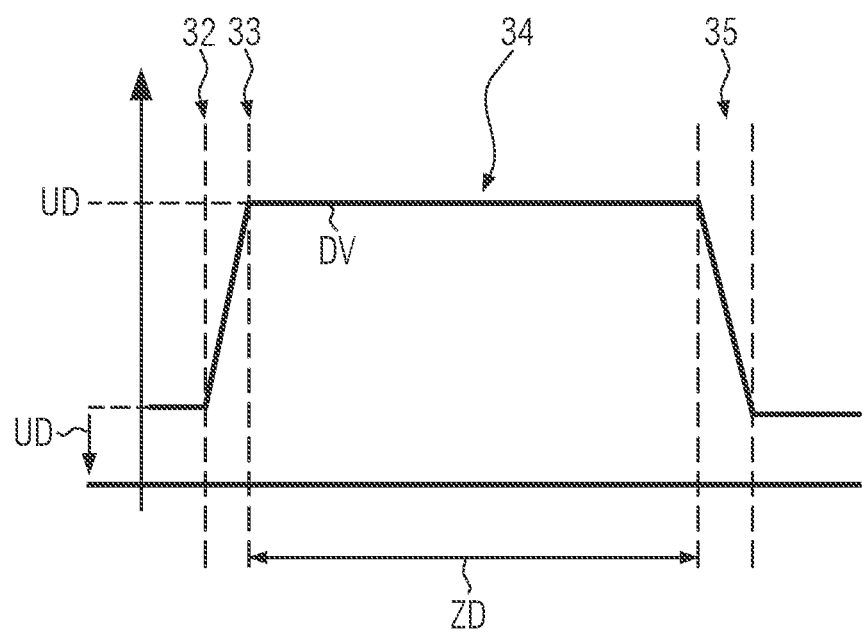
FIG. 5 shows a schematic representation of a pressure profile measured.

The invention is based on the idea to temporarily replace the function of third seal 8 and inserted container 9 with sealing attachment 14 and to at least in this configuration measure a pressure profile DV in pressure chamber 2 outside the production operation after a predetermined positive pressure ÜD and/or negative pressure UD has been generated (see FIG. 5).

This is possible particularly efficiently, for example, in the context of overall cleaning (CIP). Such pressure profiles DV measured can then be compared to pressure values and/or pressure profiles DV measured during normal production operation and/or during additional tightness controls with containers 9 and/or suitable test members (not shown). Any leaks possibly detected can then respectively be assigned to first and second seals 6, 7 or to third seal 8.

Figure 3:
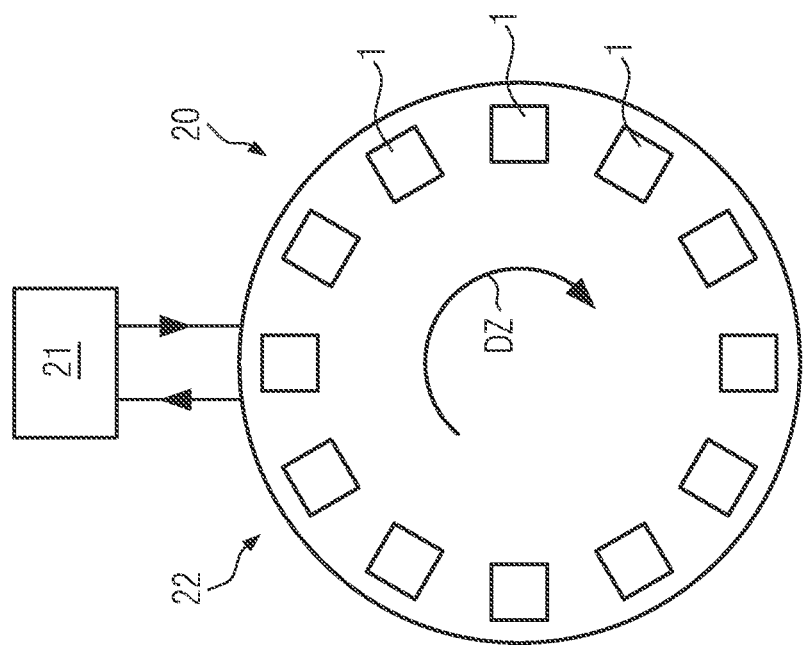
FIG. 3 shows a schematic top view onto a filling-sealing machine.

For this purpose, preferably all filling-sealing units 1 present at a filling-sealing machine 20 of the rotary type indicated schematically in FIG. 3 are connected to a CIP cleaning circuit 21. The inflow of the cleaning agent is there effected, for example, via a suitable product, pressurization gas and/or vacuum line and the outflow through attachment 14 (not shown), or otherwise. CIP cleaning is performed with a rotating filling-sealing machine 20 preferably simultaneously at all filling-sealing units 1.

Figure 4:
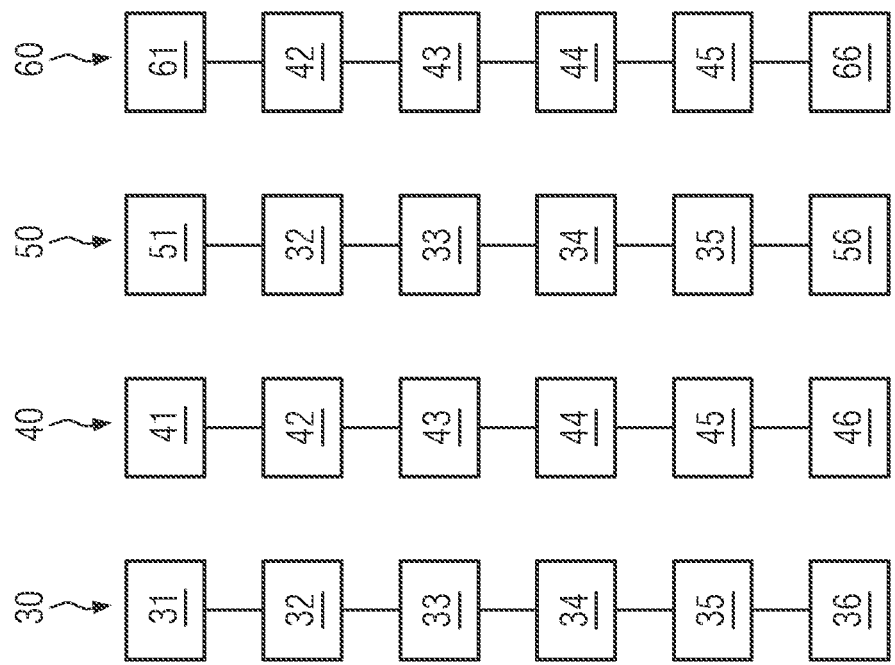
FIG. 4 shows an operation chart of the method with variants of pressure monitoring.

Individual tightness controls 30, 40, 50, 60 at filling-sealing units 1 are described below with reference to the flow charts of FIG. 4.

According thereto, tightness control 30 with attachment 14 under the application of a positive pressure ÜD to pressure chamber 2 is performed as follows.

In a step 31, attachment 14 is attached, for example, in the context of overall cleaning filling-sealing unit 1 (CIP), to lower section 5a of housing 5 around sealing seat 5b and pressure chamber 2 is there during tightness control 30 sealed in a gastight manner against the environment.

In a subsequent step 32, first pressure line 11 is opened, for example, by opening valve 11a, and a pressurization gas is supplied into pressure chamber 2. The latter is preferably acted upon by at least the pressurization gas pressure used during the normal working operation of the filling-sealing unit, for example, with a positive pressure ÜD of at least 1 bar, in particular of at least 3 bar. Preferably $CO_2$ is used as the pressurization gas which typically also serves as the pressurization gas during regular working operation. This allows tightness control of first and second seals 6, 7 under conditions of actual practice. However, the use of compressed air or the like would also be conceivable.

In a subsequent step 33, the supply of the pressurization gas is interrupted by closing first pressure line 11, for example, by way of valve 11a. With correct operation of first and second seals 6, 7, the positive pressure ÜD generated in pressure chamber 2 should thereafter remain substantially constant for an appropriate monitoring period of, for example, 1 to 10 s.

In a subsequent step 34, pressure profile DV in pressure chamber 2 is monitored, for example, with the aid of pressure sensor 19 and control unit 18 or a similar computing unit, over a predetermined period of time ZD (see FIG. 5) of for example 1 to 10 s. Pressure values measured by pressure sensor 19 are stored for further evaluation.

In a subsequent step 35, pressure chamber 2 is depressurized in an appropriate manner, for example, by temporarily opening a negative pressure valve 12a, 16a.

In a subsequent step 36, pressure profile DV measured in step 34 is verified for correctness. If an inadmissible pressure drop is detected, the cause of this can possibly already be assigned to first seal 6 and/or second seal 7 depending on the extent of the pressure drop, since the function of third seal 8 has previously been replaced by attachment 14. Although a malfunction of third seal 8 cannot yet be ruled out based on this alone, corrective maintenance or further tightness controls 40, 50 could still be initiated in a selective manner.

In addition or alternatively, tightness control, in principle performed in an analog way with attachment 14, while pressure chamber 2 is acted upon with a negative pressure UD, is performed as follows.

For this purpose, attachment 14 is attached in a step 41 analogous to step 31 or remains in its sealing position after tightness control 30.

In a subsequent step 42, pressure chamber 2 is connected, for example, by opening valve 12a, to second pressure line 12 and thereby evacuated up to a negative pressure UD of, for example, 0.5 to 0.05 bar.

In a subsequent step 43, second pressure line 12 is closed, for example, by closing valve 12a. If first seal 6 and second seal 7 function properly, the negative pressure UD generated in pressure chamber 2 in this way should remain substantially constant for an appropriate monitoring period of, for example, 1 to 10 s.

In a subsequent step 44, the pressure profile DV in pressure chamber 2 is monitored starting out from the negative pressure UD generated in step 43 over a predetermined period of time ZD of, for example, 1 to 10 s. The pressure profile DV is measured, for example, with pressure sensor 19 and associated pressure values are transmitted to control unit 18 or a similar computing unit and stored there.

In a subsequent step 45, pressure chamber 2 can be brought back to ambient pressure in an appropriate manner, for example by temporarily opening a positive pressure valve 11a, 15a.

In a subsequent step 46, pressure profile DV measured in step 44 is verified for correctness. If an inadmissible pressure increase is detected, the cause of this can possibly already be assigned to first seal 6 and/or second seal 7 depending on the extent of the pressure increase, since the function of third seal 8 has previously been replaced by attachment 14. Although a malfunction of third seal 8 cannot yet be ruled out based on this alone, corrective maintenance measures or further tightness controls 30, 50 can possibly be initiated in a selective manner.

Tightness controls 30, 40 with attachments 14 are preferably performed at each of filling-sealing units 20 present at filling-sealing machine 1. This is possible in parallel at all filling-sealing units 1. The pressure values measured with respective pressure sensors 19 can be read out in a known manner and transmitted to control unit 18 or a similar computing unit for evaluation.

Tightness control 50 of each filling-sealing unit 1 is preferably performed in a basically analogous manner without attachment 14 and instead with a container disposed in third seal 8 while pressure chamber 2 is acted upon with a positive pressure ÜD as follows.

In a step 51, each filling-sealing unit 1 is fed a container 9 and its neck finish portion 9a is received by third seal 8 and thus tightly enclosed, for example, by compressed air acting thereupon.

Steps 32 to 35 are subsequently performed.

In a subsequent step 56, pressure profile DV measured in preceding step 34 is verified for correctness. If an inadmissible pressure drop is detected, the cause can possibly already be assigned to third seal 8, in particular with correct pressure profile DV of comparable tightness control 30 depending on the extent of the pressure drop. A malfunction of third seal 8 can be reliably detected or excluded in comparison with tightness control 30 which was also performed with attachment 14. As a result, corrective maintenance can possibly be initiated in a selective manner and performed quickly.

Tightness control 60 of each filling-sealing unit 1 is preferably additionally performed in a basically analogous manner without attachment 14 and with a container disposed in third seal 8 while pressure chamber 2 is acted upon with an underpressure UD as follows.

In a step 61, each filling-sealing unit 1 is fed a container 9 and its neck finish portion 9a is received by third seal 8 and thus tightly enclosed, for example, by compressed air acting thereupon.

Steps 42 to 45 are subsequently performed.

In a subsequent step 66, pressure profile DV measured in preceding step 44 is verified for correctness. If an inadmissible pressure increase is detected, the cause can possibly already be assigned to third seal 8, in particular with correct pressure profile DV of comparable tightness control 40 and depending on the extent of the pressure increase. A malfunction of third seal 8 can be reliably detected or excluded in comparison with tightness control 40 which was also performed with attachment 14. As a result, corrective maintenance can possibly be initiated in a selective manner and performed quickly.

Steps 32 to 34 and 42 to 44 can be basically performed with containers 9 with product feeder 4 attached or not attached, i.e. including or excluding the container volume.

Steps 32 to 34 and 42 to 44 could also be performed with the aid of pressurization gas line 15 and valve 15a or with vacuum line 16 and valve 16a.

Tightness controls 50, 60 with containers 9 attached can be performed in the form of test runs of filling-sealing machine 20 with a rotational speed DZ that is reduced compared to normal operation (see FIG. 3) in order to extend the monitoring of the pressure profile DV in an appropriate manner. Similarly, tightness controls 50, 60 are possible particularly in step with practice at the rotational speed DZ used during production operations.

The test runs preferably each comprise at least two revolutions of all filling-sealing units 1, so that their tightness controls 50, 60 are each performed with at least two different containers 9. This takes account of faults due to manufacturing tolerances of containers 9.

Separate test runs for tightness control 50, 60 of filling-sealing units 1 with containers 9 can be optimized in a selective manner to meet the requirements for good readings of pressure profiles DV generated in pressure chamber 2.

It is also conceivable to integrate tightness controls 50, 60 into a normal filling-sealing process of the production operation with containers 9 inserted. For example, the pressurization gas, in particular $CO_2$, can be filled up to a predetermined positive pressure ÜD into containers 9 and into pressure chamber 2 for expelling oxygen from containers 9 prior to the filling process. Monitoring pressure profile DV in pressure chamber 2 is possible at least over a comparatively short period of time ZD.

The tightness controls 30, 40 with attachments 14 can be performed at suitable control intervals, cleaning intervals or, in case of suspicion of leakage, based on the pressure profiles measured during regular production operation.

Third seal 3 is comparatively sensitive due to its split design and the stress when receiving and sealing containers 9. Separate tightness control 30, 40 of first and second seals 6, 7 with attachment 14 facilitates the quick assignment of leaks and a timely replacement of the seal.

If one of the checked filling-sealing units 1 does not meet the requirements for the pressure profiles DV at positive pressure ÜD and/or negative pressure DU with attachment 14 and/or with container 9 inserted, then respective filling-sealing unit 1 is preferably moved to a suitable maintenance point 22 of filling-sealing machine 20. There, the respective filling-sealing unit 1 can be repaired, for example, by replacing improperly working seals 6, 7, 8. Preferably, all filling-sealing units 1, which are recognized as not being improperly sealed, are moved successively to maintenance point 22 for the respective repair.

Tightness controls 50, 60 with containers 9 inserted can regularly be integrated into the ongoing production operation at predetermined control intervals. If existing or imminent leaks are detected at individual filling-sealing units 1, tightness controls 30, 40 can be performed with attachment 14 with little effort in equipment and time, for example, in the context of overall cleaning (CIP).

The results of all tightness controls 30, 40, 50, 60 can be incorporated into trend analyses in order to monitor the function of seals 6, 7, 8 in the long term and, for example, to prevent an imminent malfunction of the filling-sealing units 1 by corrective maintenance. For example, pressure profiles DV of individual filling-sealing units 1, each from similar tightness controls 30, 40, 50, 60, can be compared to each other. An increase in the recorded pressure drops or pressure increases then indicates a deteriorating function of the first and second seals 6, 7 or third seal 8.

As an alternative to containers 9, test members (not shown) could be used to eliminate or simulate certain manufacturing tolerances of containers 9 for tightness control 50, 60. Tightness control 50, 60 itself can then be verified and possibly be optimized in terms of its information content and reliability.

FIG. 5 schematically illustrates step 34, namely monitoring pressure profile DV in pressure chamber 2 over a period of time ZD after a positive pressure ÜD has been generated. Schematically indicated are furthermore above described steps 32, 33 and 35. For better understanding, negative pressure DU is further indicated, the course of which would be monitored in step 44 (not shown in FIG. 5) in a respective manner.

The invention claimed is:

1. A method for tightness control of a filling-sealing unit for containers, where a pressure chamber formed at said filling-sealing unit is sealed by way of a first seal against a sealer that is movable therein and by way of a second seal against a product feeder, wherein a third seal formed for sealing said pressure chamber around a neck finish portion and/or a neck portion and/or a shoulder portion of said containers is temporarily sealed from the outside with an attachment, thereby temporarily replacing the function of the third seal and an inserted container of said containers with the sealing attachment, a positive pressure and/or negative pressure is generated in said pressure chamber, a pressure line used for this purpose is closed, and then a pressure profile in said pressure chamber is measured, where a container is introduced with at least one of its neck finish portion, neck portion and shoulder portion into said third seal, where compressed air is provided to the third seal such that the same encloses the neck finish/neck/shoulder portion of the container in a liquid-tight and gas-tight manner in relation to at least one of a positive pressure and a negative pressure prevailing during working operation of the filling-sealing unit, and where at least one of the positive pressure and the negative pressure is generated in said pressure chamber, said pressure line used for this purpose is closed, and then a pressure profile in said pressure chamber is measured.

2. The method according to claim 1, where a test member simulating said neck finish portion, said neck portion, and/or said shoulder portion of said containers is introduced into said third seal, a positive pressure and/or negative pressure is generated in said pressure chamber, said pressure line used for this purpose is closed, and then a pressure profile in said pressure chamber is measured.

3. The method according to claim 1, where a positive pressure of at least 1 bar is generated.

4. The method according to claim 1, where said positive pressure is generated by introducing $CO_2$.

5. The method according to claim 1, where a negative pressure of 0.1 bar or less is generated.

6. The method according to claim 1, where said pressure profile is respectively measured over a period of time of at least 0.5 seconds.

7. The method according to claim 1, where tightness control is performed on all filling-sealing units of a filling-sealing machine of a rotary type.

8. The method according to claim 7, where tightness control is performed for every filling-sealing unit at least twice consecutively with different containers.

9. The method according to claim 7, where said filling-sealing units are moved to a corrective maintenance point of said filling machine in case they fail said tightness control.

10. The method according to claim 7, where said tightness control is performed with said containers at a maximum rotational speed of said filling machine intended for production operation.

11. The method according to claim 7, where said tightness control is performed with said containers at a reduced rotational speed relative to normal production operation or at a standstill of said filling machine.

12. The method according to claim 7, where tightness control is performed several times during and/or between ongoing production operation and a trend analysis based thereon is created for said filling-sealing units controlled for tightness.

13. The method according to claim 1, wherein a CIP agent is passed prior to tightness control through said filling-sealing unit sealed with said attachment.

14. A filling machine of a rotary type with several filling-sealing units and with a programmable control unit for performing test runs following the method according to claim 1.

15. The method according to claim 1, where a positive pressure of at least 3 bar is generated.

16. The method according to claim 1, where said pressure profile is respectively measured over a period of time of at least 5 seconds.

* * * * *